United States Patent
Kato et al.

[11] 3,943,759
[45] Mar. 16, 1976

[54] APPARATUS FOR MEASURING COMPRESSION PRESSURES IN INTERNAL-COMBUSTION ENGINE

[75] Inventors: Takayuki Kato; Satoshi Yamazaki, both of Aichi, Japan

[73] Assignees: Toyota Jidosha Hanbai Kabushiki Kaisha; Kabushiki Kaisha Toyota Chuo Kenkyusho, both of Aichi, Japan

[22] Filed: Oct. 31, 1974

[21] Appl. No.: 519,779

[30] Foreign Application Priority Data
Nov. 5, 1973  Japan............................ 48-124260

[52] U.S. Cl. ................................................ 73/115
[51] Int. Cl.² ............................................ G01M 15/00
[58] Field of Search ............... 73/115, 117.3, 116; 324/16 S

[56] References Cited
UNITED STATES PATENTS

| | | | |
|---|---|---|---|
| 3,005,948 | 10/1961 | Broder et al. | 73/116 |
| 3,035,438 | 5/1962 | Hale | 324/16 S |
| 3,393,557 | 7/1968 | Brown et al. | 73/116 |
| 3,499,322 | 3/1970 | Pelta et al. | 73/116 |
| 3,793,583 | 2/1974 | Glomski et al. | 324/16 S |

OTHER PUBLICATIONS
Dyna-Vision Instruction Manual, p. 55, June 22, 1960.

*Primary Examiner*—James J. Gill
*Assistant Examiner*—Anthony V. Ciarlante
*Attorney, Agent, or Firm*—Karl W. Flocks

[57] ABSTRACT

An apparatus for detecting and indicating the pressure under which the air-fuel mixture is compressed in an internal-combustion engine for automobile vehicles, and more particularly an apparatus of the type which comprises probe means adapted to detect a compression pressure exerted during the compression stroke in the combustion chamber, and a plurality of electric circuits for processing signals from the probe means and indicating on display means the compression pressure as detected.

20 Claims, 21 Drawing Figures

APPARATUS FOR MEASURING COMPRESSION PRESSURES IN INTERNAL-COMBUSTION ENGINE

BACKGROUND OF THE INVENTION

This invention relates to an apparatus for detecting and measuring the pressure under which the air-fuel mixture is compressed during the compressed stroke, and more particularly to an apparatus of the type which is capable of detecting and measuring a compression pressure that is produced during the compression stroke to compress the air-fuel mixture in the combustion chamber.

It is well known that the internal-combustion engine provides its very good operating characteristics by compressing the air-fuel mixture to a desired compression ratio. It is also known that if there is any leakage of the compression pressure from the combustion chamber with an accompanying reduction in the pressure during the compression stroke, it may appreciably impair the efficiency of the engine which leads to a decrease in the torque or misfire.

In order to avoid such abnormal situation and in order to run the engine under the most satisfactory condition, it is desirable to previously measure compression pressures exerted in the combustion chamber. From this aspect, it is the practice that the compression pressure is measured as often as possible during the assembly line or periodical inspection and maintenance of the engine in attempts to run the engine in the optimum condition.

There is known a compression tester which is generally used for this purpose. In the conventional practice according to the tester, spark plugs are usually removed from the combustion chamber. The tester has a member from which the pressure is to be admitted into the tester by inserting the member into the combustion chamber. The tester has also an indicator which indicates the pressure under which the air-fuel mixture is compressed in the combustion chamber by actuating the bellows or diaphragm under the pressure that has been admitted. In other words, the method according to the tester consists of steps of removing spark plugs from the engine, of inserting a part of the tester into the combustion chamber which must be carefully kept airtight after removal of the spark plugs and of running the engine by means of a cell-driven motor, for example, so as to compress the mixture in the combustion chamber for measuring the pressure thus exerted. However, this presents disadvantages from the aspects of the operability and precision that the tester provides, since it always requires removal of spark plugs from the combustion chamber, and great care must be taken to keep the chamber airtight for insertion of the tester therein. For this reason, significant measuring errors may occur, depending on the manner in which the tester is disposed.

There is another known method of measuring the compression wherein a pressure transducer incorporating a semiconductor strain gauge is employed in lieu of the earlier mentioned tester. However, this method is disadvantageous alike since it requires a transducer of a relatively complicated construction.

An apparatus provided according to the invention is intended for measuring compression pressures exerted in the combustion chamber by detecting and analysing secondary voltages of the ignition system. More specifically, the present invention is based on the observation that a secondary voltage includes a portion which has a value corresponding to the level at which a compression pressure is exerted during the compression stroke in the combustion chamber. The experimental results have also shown that the portion of induced discharge voltage contained in the secondary voltage changes proportionally with the level of the compression pressure. It will be understood from the above that the level of the compression thus exerted can be easily and visibly obtained by detecting the secondary voltage and analysing the waveform thereof.

SUMMARY OF THE INVENTION

According to the present invention, there is provided a probe that essentially comprises a potential or voltage divider and a member for insertion in the ignition system of the engine. The probe is adapted to detect the secondary voltage at the secondary coil of the ignition system. The secondary voltage thus detected is then electrically processed in a plurality of electric circuits which supply data of the compression pressure as detected.

As is easily understood from the above, it provides easy means of measuring compression pressures exerted in the combustion chamber, eliminating the need of removing spark plugs from the combustion chamber and the care of keeping the chamber airtight for insertion of a measuring member or like therein.

It is therefore one object of the present invention to provide an apparatus for measuring the pressure under which the air-fuel mixture is compressed in the combustion chamber of an internal-combustion engine, whereby the pressure can be detected during the operation of the ignition system in the engine.

It is another object of the present invention to provide an apparatus of the type which can detect the pressure under which the mixture is compressed at every top dead point of the piston regardless of the number of revolutions of the engine.

It is still another object of the present invention to provide an apparatus of the type which can detect a compression pressure in each cylinder of a multicylinder engine.

Other objects and advantages of the present invention will be clearly understood from the specification that follows hereinafter by referring to the accompanying drawings and from the appended claims.

DESCRIPTION OF THE PREFERRED EMBODIMENTS

Figures 1, 2:
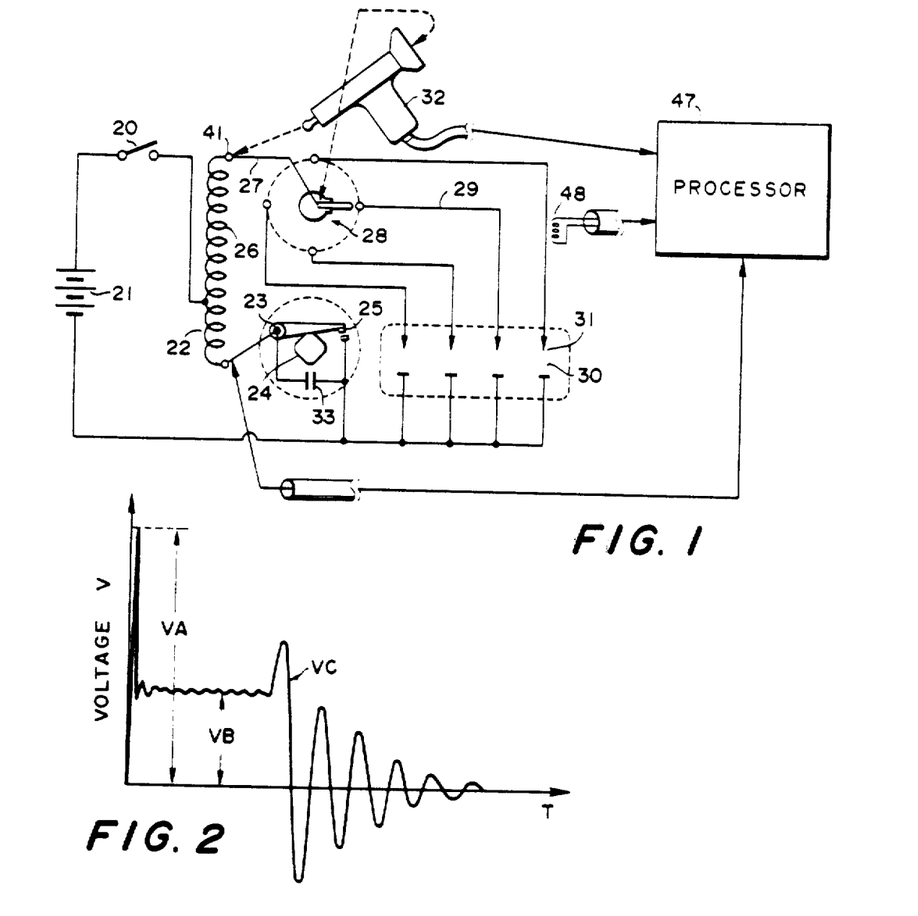
FIG. 1 is a schematic diagram of a preferred embodiment of an apparatus according to the present invention.
FIG. 2 shows a waveform of a secondary voltage of the ignition system in the engine.
Figure 3:
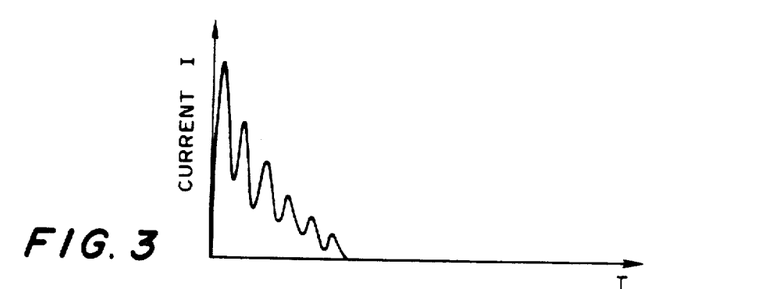
FIG. 3 shows a secondary current which has a waveform corresponding to that of the secondary voltage of FIG. 2.

The present invention will further be described by way of preferred embodiments by reference to the accompanying drawings, in which:

FIGS. 1, 2 and 3 are first referred to in order to clarify the principle on which the pressure under which the air-fuel mixture is compressed in the combustion chamber is measured by detecting and analysing secondary voltage and current signals from the ignition system. FIG. 1 shows an ignition system of an automobile internal-combustion engine.

When an ignition switch 20 is turned on, current from a battery 21 flows through a primary winding 22 of an ignition coil to a breaker arm 23 of a distributor. It is well known that rotation of a circuit-breaker cam 24 opens and closes the circuit of the primary winding 22. When the cam 24 rotates to close the contact or breaker points 25 of the circuit breaker, current flows through the primary winding 22. Separation of the breaker points 25 by the cam 24 breaks the primary circuit and causes the magnetic field to collapse rapidly, inducing by self-induction usually some 100-volt voltage across each turn of the primary winding 22 of the ignition coil, and inducing by mutual-induction usually a very high secondary voltage in the range of 15 to 20 kv. in the secondary winding 26. The secondary voltage is distributed via an ignition coil wire 27 and a rotor 28 of the distributor to each of the cylinders from which it is then applied through spark plug wires 29 to each of the spark plugs 31 arranged in the combustion chamber 30.

When the secondary voltage is applied to each of the spark plugs 31, it jumps the gap between the electrodes of the spark plug 31 to provide sparks, thus igniting the air-fuel mixture in the combustion chamber 30.

FIG. 2 shows a waveform of the secondary voltage as it jumps the gap of the spark plug 31. The secondary voltage is detected and converted into a secondary voltage signal by the probe 32 of the invention which has a member to make contact with the ignition system. In this case, there is no need of removing spark plugs from the engine.

There is shown a secondary current signal in FIG. 3. In FIG. 2, there is shown a secondary voltage signal which consists essentially of three parts. A first signal region, shown as abrupt slope VA, represents a dielectric breakdown voltage across the electrodes of the spark plug 31, which may be usually called as capacity discharge voltage (hereinafter referred to as "part VA"). This signal region is a region in which the voltage value appreciably varies with the pressure in the combustion chamber, the ambient relative humidity and the stray capacities in ignition coil wire and spark plug wires.

A second signal region, shown as an even part VB, represents an induced discharge voltage (hereinafter referred to as "part VB") which lasts as long as the spark plug is sparking.

A third signal region VC represents a free-oscillating discharge voltage (hereinafter referred to as "part VC") which takes place after the sparks disappear and which can be held from oscillating by a capacitor or condenser 33 in the distributor.

The apparatus provided according to the present invention is based on the observation that the part VB varies proportionally with changes in the pressure under which the air-fuel mixture is compressed during the compression stroke, and is constructed such that it can detect the secondary voltage signal by the probe means, electrically selects and processes an induced discharge voltage signal corresponding part VB included in the secondary voltage signal and indicates the voltage value of the induced discharge voltage signal thereof as a compressed pressure in the combustion chamber in the engine.

Figure 4:
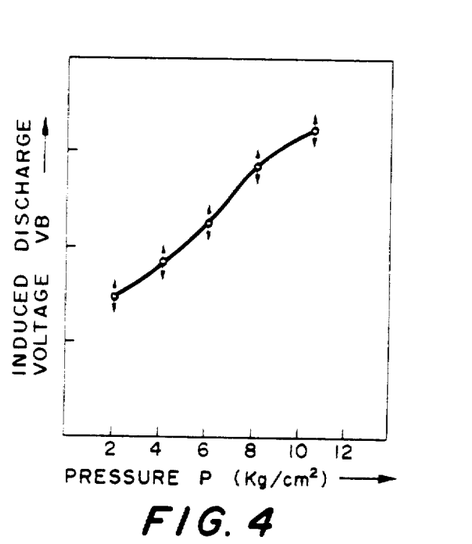
FIG. 4 is an operating characteristic diagram on which the present invention is based, showing relations between the secondary voltage and the compression pressure.

FIG. 4 shows the relations between the compression pressure P exerted in the combustion chamber and the part VB, which have been obtained from the experimental results. It is seen from FIG. 4 that very favorable relations exist between the two.

The probe 32 has a member to be interposed between the secondary winding 26 and the rotor 28 so as to detect the level of the secondary voltage. It is so highly operable that it can continue to detect a secondary voltage for each cylinder of the multicylinder engine. As mentioned above, the probe 32 is used to detect the level of a secondary voltage of the ignition coil, and has a circuit to convert it into an electrical signal.

Figure 5:
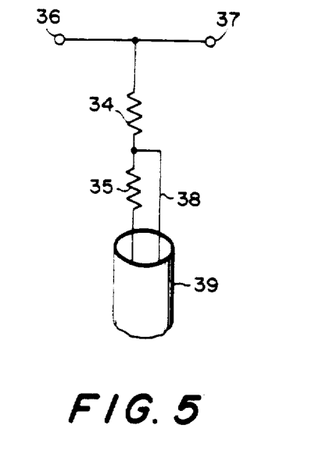
FIG. 5 is a circuit diagram of a preferred example of the probe to be used for the present invention.

More details of the probe 32 are now given below. FIG. 5 indicates an electric circuit diagram of the probe 32 which includes a potential or voltage divider circuit consisting of resistors 34 and 35 to divide and convert the secondary voltage into a low-voltage signal. The divider circuit has one input terminal 36 detachably connected to the secondary terminal 41 of the ignition coil, and the other terminal 37 detachably connected to the ignition coil wire 27. A low-voltage signal that is obtained by dividing the secondary voltage flows through a signal transmission line 38 to a coaxial cable 39.

Figure 6:
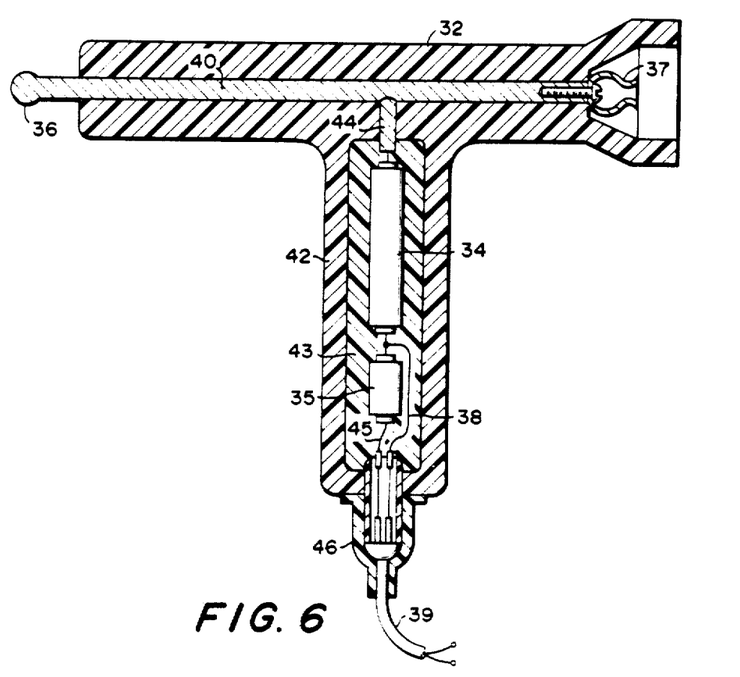
FIG. 6 is a sectional view of the probe of FIG. 5 in which its construction is shown.

FIG. 6 shows a detailed construction of the probe 32 of FIG. 5. The probe 32 has a body of electrically insulating material such as teflon or bakelite, for example, in which a conductive member 40 is fixedly disposed and electrically insulated. The conductive member 40 has input terminals 36 and 37 at opposite ends thereof, each of said input terminals 36 and 37 being detachably connected to the secondary terminal 41 of the ignition coil and the ignition coil wire 27, respectively. The resistors 34 and 35 are disposed within a holder portion 42 provided integrally with the probe 32, and are rigidly secured by mould material 43, for example, therein. The conductive member 40 and the potential divider circuit are connected to each other by means of a metallic member 44 fixed to the conductive member 40.

The signal transmission line 38 and a ground wire are each connected to a connector 46 which leads through the cable 39 to further circuits outside the probe 32.

There is provided a circuit 47 for receiving and electrically processing secondary voltage signals from the probe 32, which will now be illustrated below.

As shown in FIG. 1, the circuit 47 is adapted to receive secondary voltage signals from the probe 32, synchronizing signals from a trigger probe 48 to separate and discriminate said secondary voltage signals from each other for each cylinder, and primary voltage signals from the primary winding 22 of the ignition coil through the cable 49.

Figure 7:
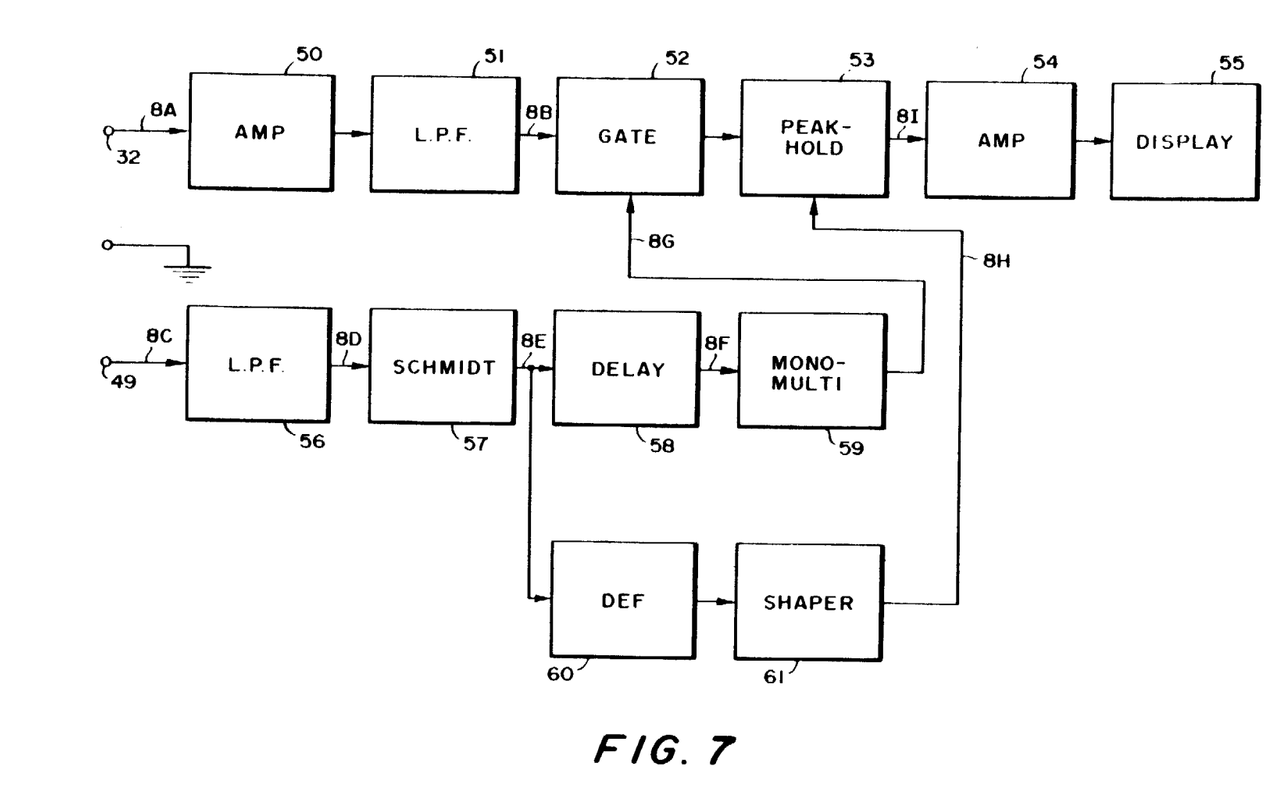
FIG. 7 is a block diagram of a preferred embodiment of an apparatus according to the present invention.

FIG. 7 indicates a block diagram of circuit elements for the circuit 47, and in FIG. 8 there is shown the waveforms of the circuit elements of FIG. 7 in the form of a timing chart.

A secondary voltage signal 8A is applied from the probe 32 to a non-inverting amplifier 50 of high input impedance, the output of which is supplied to a Butterworth-type low-pass filter 51 which passes only signals of the waveform 8B while rejecting other high-frequency noise signals and capacity discharge voltage signals. The output signal 8B thus filtered by the filter 51 flows further to a gate circuit 52 which allows only the part 8B out of the signal 8A to pass, going to a peak-hold circuit 53 where it is held or stored. The output 8I of the hold circuit 53 is supplied to an integrating amplifier circuit 54 where it is converted into a d.c. voltage signal which is then indicated by a display unit 55 to give the compression pressure as detected.

The following provides a detailed description of how the gate circuit 52 is actuated to allow only the part 8B out of the signal 8A to pass while rejecting the other parts. A primary voltage signal 8C goes to the gate circuit 52 through the cable 49 from the primary winding 22 of the ignition coil as shown in FIG. 1, and is used as a synchronizing signal to actuate the gate circuit 52. On arrival in the circuit 52, the primary voltage signal 8C is first applied to a low-pass filter 56 which rejects the passage of the noise signal portion 8D of the secondary voltage signal 8A to obtain the voltage signal 8D while allowing the signal portion 8B to pass which is further applied to a Schmidt circuit where it is shaped into a pulse 8E of a rectangular waveform. The pulse 8E thus obtained has a rise time delayed by a time $t_1$ by the action of a delay circuit 58 as shown at 8F, and goes further to a monostable multi-circuit 59 where it is converted into a pulse 8G of a duration $t_2$. The output 8G of the circuit 59 is used as a gate signal to actuate the gate circuit 52. That portion of the signal 8A which is allowed to pass through the gate circuit 52 only during the period of time $t_2$ flows to the peak-hold circuit 53 in which it is held or stored, and is reset each time a succeeding signal of the time nature is input. The signal 8E is therefore applied to a differentiating circuit 60 which is then actuated to differentiate the signal 8E with respect to a time which is shorter than the delay time $t_1$. The pulse thus obtained goes further to a waveform shaper circuit 61 where a reset signal 8H is obtained by shaping the pulse. The reset pulse 8H flows to the reset input terminal of the peak-hold circuit 53 where the previous secondary voltage signal is reset or cleared the instant that the rise time or a primary voltage signal 8C or secondary voltage starts, so that a succeeding secondary voltage signal is stored.

Referring next to the block diagram of FIG. 7, the circuit elements will be illustrated in more details. A signal 8A for a secondary voltage detected by the probe 32 is applied to an amplifier 50 of high input impedance in the form of a differential-type operational amplifier. The output of the amplifier 50 is applied to a Butterworth-type low-pass filter 51 which rejects all signals for the capacity discharge voltage and high-frequency noises contained in the signal 8A while passing only a signal 8B which flows further to an inverting amplifier consisting of an input resistance 62, feedback resistance 63 and differential-type operational amplifier 64 in which it is amplified. The output of the amplifier 64 is then applied to the source terminal of an MOS-type FET 65. On receiving a gate signal 8G at the source terminal, the FET 65 becomes electrically conductive, allowing the secondary voltage signal 8B to pass only during a gate time of the gate signal 8G and arrive at the drain output of the FET 65. The output flows further to the peak-hold circuit consisting of a diode 66, capacitor or condenser 67, FET 68 and resistors 69 where it is held or stored. The signal thus held or output signal 8I flows to an inverting amplifier circuit consisting of an input resistors 70, feedback resistance 71 and differential-type operational amplifier 72 in which it is amplified. The output of the inverting amplifier circuit goes further to an integrating circuit consisting of a resistors 73 and capacitor or condenser 74, said integrating circuit being then actuated to convert said output into a d.c. voltage signal while rejecting the reset signal 8H which will be explained later. The d.c. voltage signal thus obtained is indicated by the display unit 55 to provide the compression as detected in the combustion chamber.

The following gives a detailed description of a synchronizing circuit for generating the gate signal 8G and reset signal 8H. The primary voltage signal 8C which is initially detected through the cable 49 from the primary winding terminal of the ignition coil goes to a low-pass filter which rejects noise signal portions from the signal 8C. The signal thus filtered goes further to a zero-cross type Schmidt circuit consisting of input resistors 75, 76 and 77, a feedback diode 78, a feedback resistors 79 and differential-type operational amplifier 80. The Schmidt circuit normally has a negative voltage $-e_1$ applied through the input resistors 76, rendering the diode 78 non-conductive and supplying an output signal "1" from the output of the Schmidt circuit. When a positive primary voltage signal 8D is applied through the input resistors 75 to the amplifier 80, the diode 78 is then rendered electrically conductive and an output signal "0" is supplied from the output of the Schmidt circuit. The output signal 0 goes further to an inverting circuit consisting of a transistor 81 and a resistors 82. When the signal 0 is inverted by the inverting circuit, it appears as an output signal 8E of a value 1 as the breaker points 25 are open or when a secondary voltage starts. The output 8E of the inverting circuit goes further to a delay circuit consisting of resistors 83 and 84, a diode 85, a capacitor or condenser 86 and NAND-gate 87, which is then actuated to delay the rise time of the signal 8E by a time $t_1$. The signal 8F thus obtained goes to an inverting circuit consisting of a transistor 88 and a resistors 89, the output of which goes to a monostable multi-circuit 53 consisting of capacitors 90 and 91, resistors 92, 93 and 94, a diode 95, and NAND-gates 96 and 97, in which a pulse signal of a duration $t_2$ is generated. The pulse signal goes further to a switching circuit consisting of output resistances 98, 99, 100 and 101 and a transistor 102 where it is converted into a gate signal 8G which is then applied to a gate terminal of FET 65.

Figure 8A:
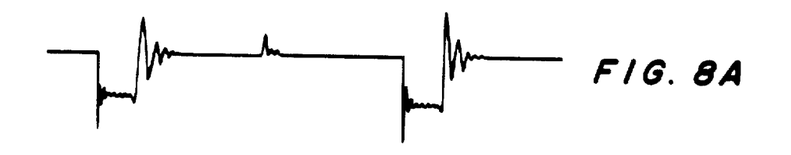
FIGS. 8A to 8I show waveforms for different circuit elements of the apparatus of FIG. 7.
Figure 8B:
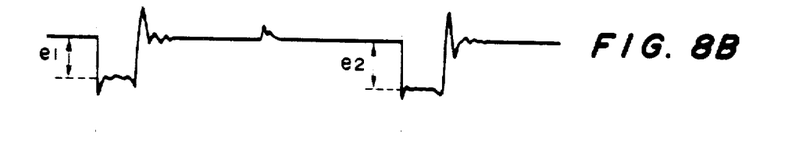
Figure 8C:
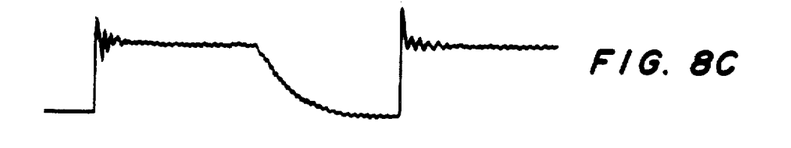
Figure 8D:
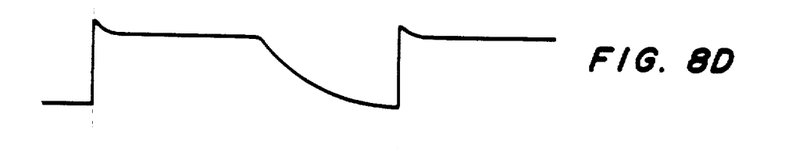
Figure 8E:
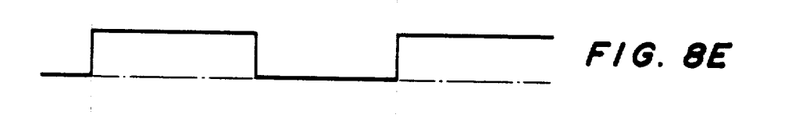
Figure 8F:
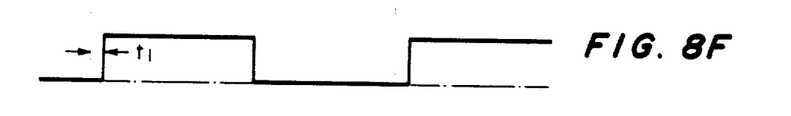
Figure 8G:
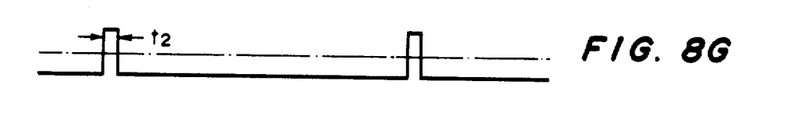
Figure 8H:
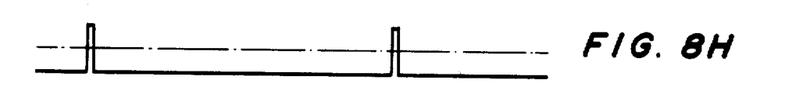
Figure 8I:
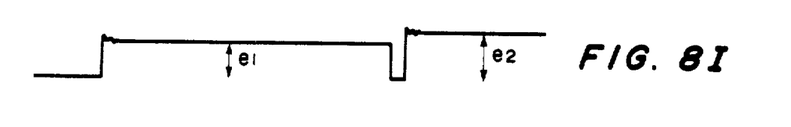

In the meantime, the output 8E of the inverting circuit goes to a differentiating circuit consisting of a capacitor 103, and a resistance 104 where it is differentiated, flowing further to NAND-gate 105 which is then enabled to convert the signal 8E into a pulse which has the differential of the input with respect to the rise time. The pulse thus obtained goes further through a switching circuit consisting of resistances 106, 107, 108 and 109, and a transistor 110 to the gate terminal of a reset FET 111 of the peak-hold circuit 53.

Figure 10:
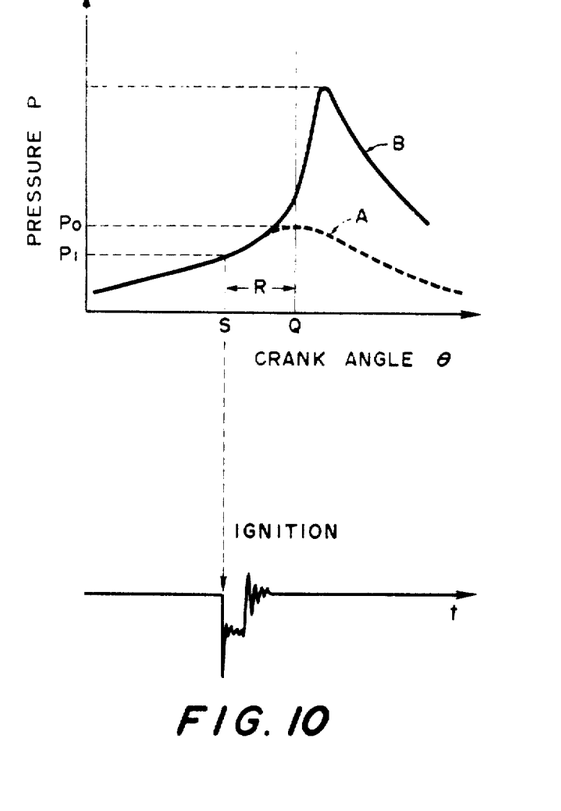
FIG. 10 is a diagram characterizing the principle of the apparatus according to the present invention.

It will clearly be understood from the foregoing that according to the present invention the pressure under which the mixture is compressed in the combustion chamber can be easily known by detecting the secondary voltage level of the ignition coil. The compression pressure that has been mentioned heretofore, however, does not represent the maximum pressure exerted in the combustion chamber. Then, this point will be clarified by referring to FIG. 10 in which an indicator diagram is given. In FIG. 10, the crank angle $\theta$ is given as the x-coordinate axis, and the pressure P in the combustion chamber is given as the y-coordinate axis. The curve A represents the static pressure under which no combustion takes place and the curve B represents the dynamic pressure under which combustion takes place.

Generally, it is desirable to measure the maximum static pressure $P_0$ in the combustion chamber. According to the present invention, however, the compression pressure is measured by detecting a secondary voltage of the ignition system and analysing its signal. It is known that the ignition timing of the engine is set at point S which is located by an ignition advance R earlier than the top dead point Q of the piston, said top dead point Q corresponding to the maximum static pressure. In this respect, the pressure that is detected in accordance with the invention represents the pressure $P_1$ substantially corresponding to the ignition timing. In normal cases, the ignition advance R is kept stable when the engine is running at constant speeds. It is therefore possible to know the maximum static pressure $P_0$ by compensating for differences in the pressure $P_1$.

The internal-combustion engine usually to be used for automobile vehicles has a wide range of speeds, which causes the ignition advance R to change with varying speeds or number of revolutions of the engine. As the point S in FIG. 10 is changing with the increasing number of revolutions, it is necessary to compare with the number of revolutions so as to know the true value of the pressure. For this purpose, there is provided a compensating circuit which is actuated to compensate for or correct any differences in the pressure due to the changes in the ignition advance R, so that it is made possible to know the pressure exerted at every top dead point of the piston.

Figure 11:
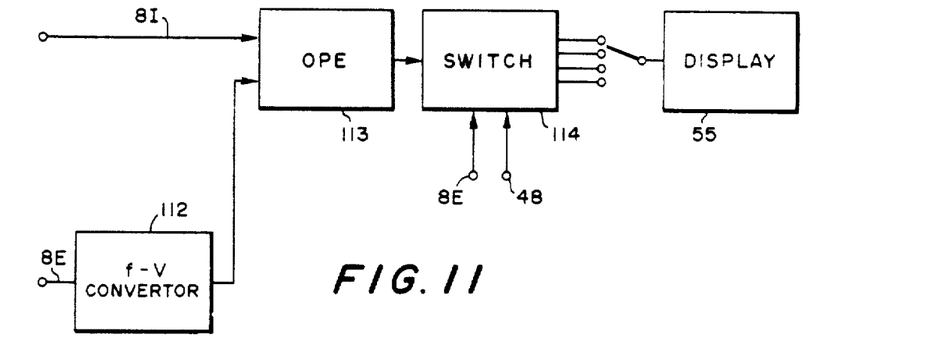
FIG. 11 is a block diagram of a compensating circuit included in the apparatus according to the present invention.
Figure 12:
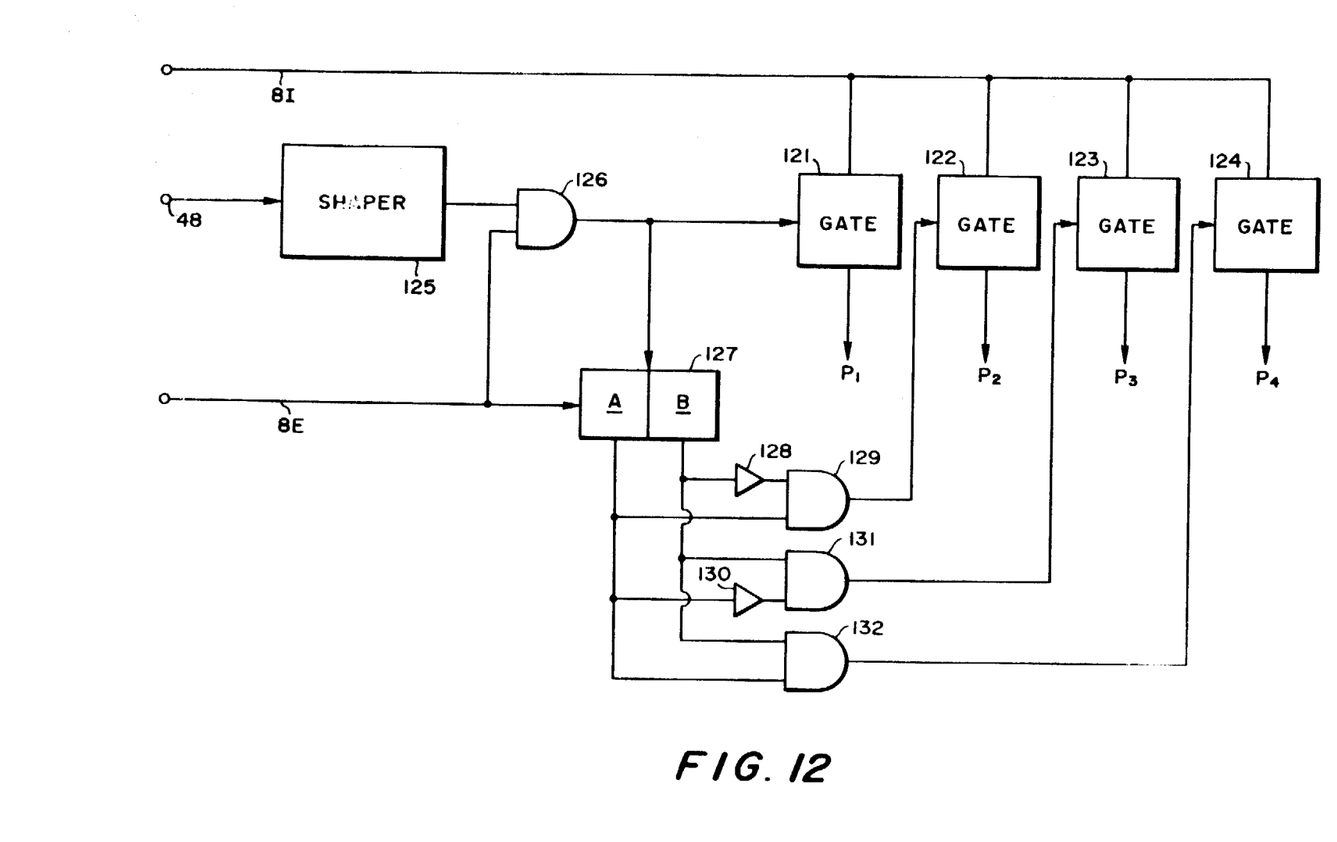
FIG. 12 is a block diagram of a signal separation circuit included in the apparatus of the present invention and which is particularly to be used for the multicylinder engine.

Referring then to FIG. 11, the compensating circuit is illustrated below.

It is well known that the ignition advance R increases in proportion to the increasing number of revolutions of the engine, and it is therefore clear from the characteristic diagram of FIG. 10 that the compression pressure decreases in proportion to the number of revolutions. The compensating circuit shown in FIG. 11 is actuated such that it can correct the secondary voltage signal from the ignition coil with a signal to represent the number of revolutions, thus automatically compensating for any difference in the pressure. In FIG. 11, the output signal 8E that is obtained by shaping the waveform of the primary voltage signal is applied to the frequency-to-voltage converter circuit 112 where it is converted into a d.c. voltage signal whose value varies with the number of revolutions of the engine. The output of the converter circuit 112 leads to one input terminal of an operational circuit 113, the other input terminal of which has a signal 8I applied. The operational circuit 113 is then actuated to sum up and compute the pressure signal 8I and the number signal, supplying an output to represent the pressure $P_0$ at the top dead center of the piston. The operational circuit 113 sends out a series of output signals which go further to a switching circuit 114 where the output signals are separated into an individual signal to represent the pressure for each cylinder which is then indicated on the display unit 55.

Details are now given of the switching circuit 114 above referred to for separating or discriminating a series of the output signals from the operational circuit 113 and indicating same on the display unit 55. As shown in FIG. 1, the probe 32 is interposed between the secondary terminal 41 of the ignition coil and the ignition coil wire 27. In the case of a four-cylinder engine, therefore, where the secondary voltage is applied to ignite the mixture in the cylinders in the order of "1 - 2 - 4 - 3" for example, the compression pressures in the cylinders can also be represented by a series of output signals in the order of 1 - 2 - 4 - 3. It is therefore necessary to separate these output signals to individually indicate the pressure for each cylinder. A series of the output signals that represent the pressure in each cylinder are supplied by the operational circuit 113 in FIG. 11, and go to the gate circuits 121, 122, 123 and 124 respectively. In the meantime the trigger probe 48 including an induction coil as shown in FIG. 1 detects a synchronizing signal from a particular cylinder such as a first cylinder, for example, the instant that the secondary voltage is applied to said first cylinder. The synchronizing signal goes further to a waveform shaper circuit 125 where it is shaped into a pulse of a given waveform, going further to one input terminal of AND-gate 126. The other input terminal of the AND-gate 126 has a secondary voltage signal applied. The signal 8E is represented by a series of pulses to synchronize with the signals which represent the secondary voltage as detected. As any one of the pulses synchronizes with the signal from the first cylinder, the AND-gate 126 is then enabled to deliver an output signal only for the first cylinder upon receiving the trigger signal from said first cylinder and a series of the primary voltage signals, said output signal going further to a gate input of the gate circuit assigned for said first cylinder. The output signal of the AND-gate 126 can also be used as a reset signal which resets or clears the register 127. Therefore, the register 127 is set to the status 0 the instant that the AND-gate 126 is enabled to deliver the synchronizing signal for the first cylinder. As other primary voltage signals are applied to the input terminal of the register 127, the register 127 which is in the status 0 is then actuated to serially store their respective secondary voltage signals like a second, third and fourth signal. When a second primary voltage signal is incoming, it sets the register 127 to the status $A = 0, b = 0$, enabling the inverting gate 128 and AND-gate 129 to actuate AND-gate 129 to deliver a synchronizing signal for opening the gate circuit 122. When a third primary voltage signal is incoming, it sets the register 127 to the status $A = 0$, $B = 1$, enabling the inverting gate 130 and AND-gate 131 to deliver a snychronizing signal for opening the gate circuit 123. Similarly, when a fourth primary signal is incoming, it sets the register 127 to the status $A = 1$, $B = 1$, enabling the AND-gate 130 to deliver a synchronizing signal for opening the gate circuit 124. As another first primary voltage signal is again incoming, it resets or clears the register 127 to the status $A = 0$, $B = 0$, enabling only the gate circuit 121 to open.

Figure 9:
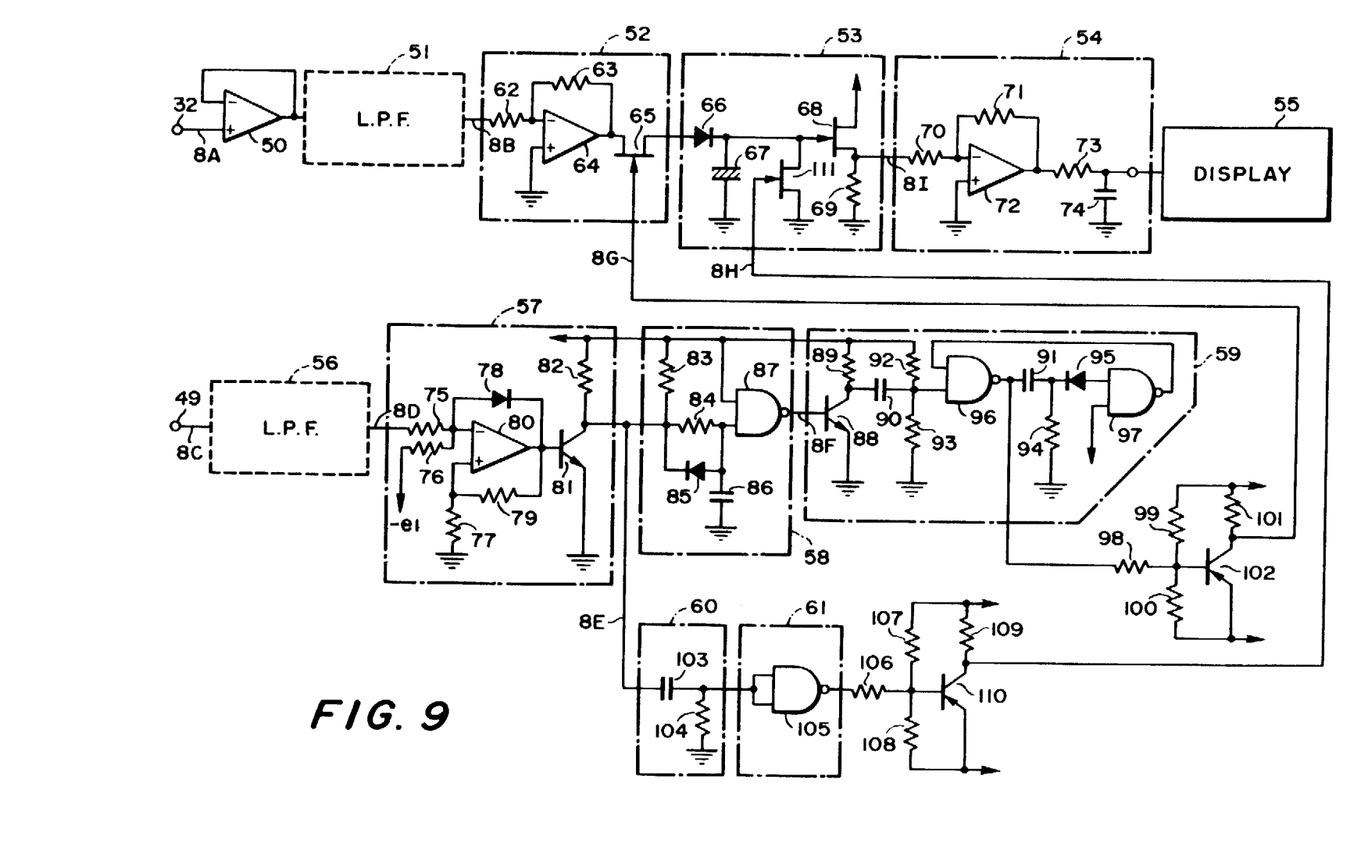
FIG. 9 is a detailed circuit diagram of the apparatus of FIG. 7.

By repeating the actions as mentioned above, the signals representing the pressures in the cylinders are separated into the signals $P_1$, $P_2$, $P_3$ and $P_4$ to individually represent the pressure in each cylinder. Each of these signals that have been separated by the switching circuit 114 to converted into a d.c. voltage signal as referred to in the embodiment of FIG. 9, which is then selected by the selector switch 133 which is adapted to select a d.c. voltage signal for any particular cylinder to be indicated by the display unit 55 such as an analog meter, for example.

Figure 13:
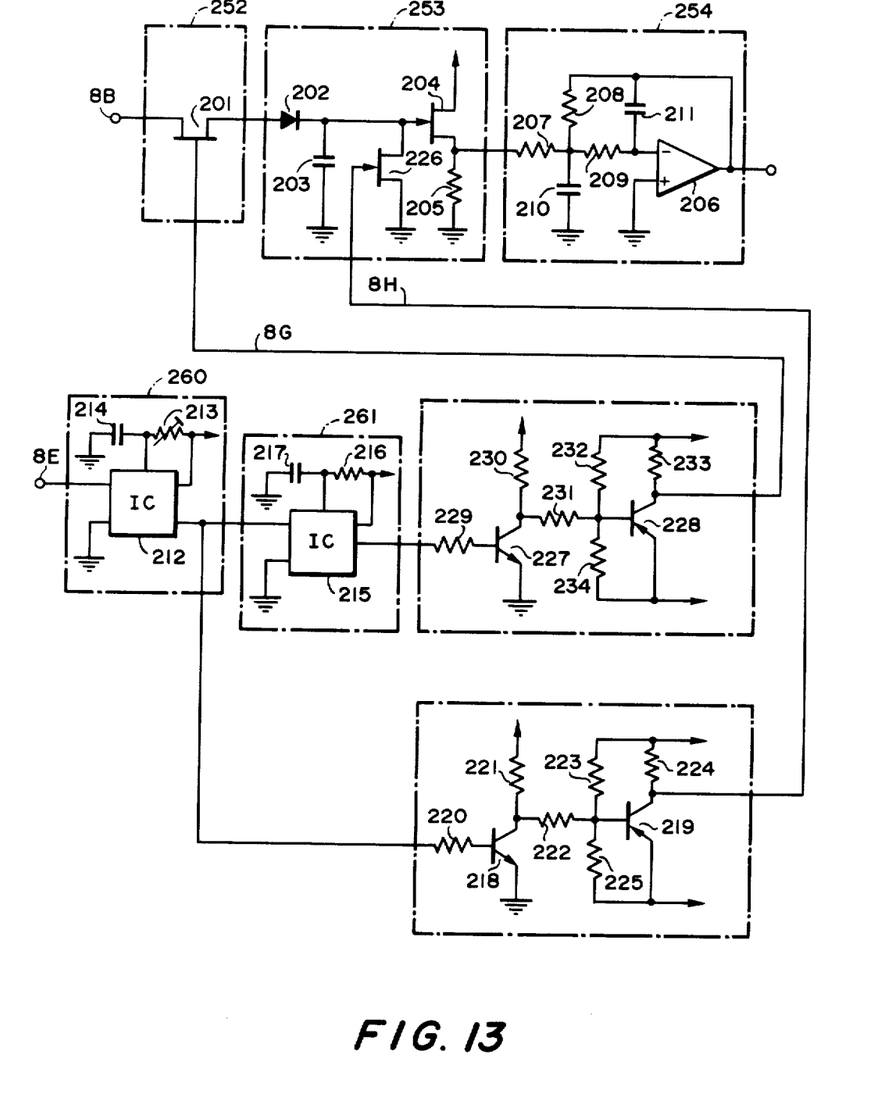
FIG. 13 is another detailed circuit diagram of the apparatus of FIG. 7.

FIG. 13 indicates a circuit diagram of another preferred embodiment of the apparatus according to the present invention. As this embodiment is substantially similar to the earlier-mentioned embodiment of FIG. 9, it will also be described by referring to FIG. 8.

The signal 8B that is obtained by filtering the secondary voltage signal detected by the probe 32 so that all noise signals may be removed from said secondary voltage signal goes to a gating circuit 252 including FET 201 where only signals to represent the induced discharge voltage are selected. The output of the gating circuit 252 leads to a peak-hold circuit 253 consisting of a diode 202, capacitor 203, FET 204 and resistor 205 where it is held or stored. The output of the peak-hold circuit 253 leads to an integrating amplifier circuit 254 consisting of a differential amplifier 206, resistor 207, 208, and 209, and capacitors 210 and 211 where it is converted into a d.c. voltage signal. The output of the circuit 254 goes further to a display unit (not shown) which indicates the compression pressure as detected in a readable form.

The gate signal from the gating circuit 252 and the reset signal from the peak-hold circuit 253 are obtained from the signal 8E which has its waveform shaped by a Schmidt circuit. The signal 8E goes to a known monostable circuit 260 consisting of IC 212, resistor 213 and capacitor 214 where it is converted into a pulse of given duration. This pulse goes further to another monostable circuit 261 consisting of IC 215, resistor 216 and capacitor 217 where it is converted into a pulse whose timing is further delayed. The output of the monostable circuit 260 leads to a switching circuit consisting of transistors 218 and 219, and resistors 220, 221, 222, 223, 224 and 225 where it is converted into a reset signal which is fed further to a gate of FET 226 of the peak-hold circuit 253.

The output of the monostable circuit 261 leads to a switching circuit consisting of transistors 227 and 228, and resistors 229, 230, 231, 232, 233 and 234 where it is converted into a gate signal which is further fed to a gate of FET 201.

While the invention has been described in conjunction with the preferred embodiments thereof, it is to be understood that numerous modifications and changes may be made without departing from the spirit and scope of the invention.

What is claimed:

1. An apparatus for measuring a pressure under which the air-fuel mixture is to be compressed during the compression stroke in the combustion chamber of an automobile internal-combustion engine, said apparatus comprising probe means including resistor means for detecting a secondary voltage signal consisting of a capacity discharge voltage signal, an induced discharge voltage signal and a free-oscillating discharge voltage signal from an ignition system, which probe means having one end connected to a secondary terminal of a secondary winding of an ignition coil and the other end connected to a rotor of a distributor which is connected to said secondary terminal of said secondary winding; a plurality of electric circuits connected to said probe means for selecting only said induced discharge voltage signal from said secondary voltage signal detected by said probe means, electrically processing said induced discharge voltage signal and indicating the value of said induced discharge voltage as the compressed pressure in the combustion chamber in a readable form.

2. The apparatus according to claim 1, wherein said plurality of electric circuits include a gating circuit actuated to select said desired signal from said secondary-voltage signal, a peak-hold circuit actuated to hold a voltage level of said desired signal during a given period of time, a display unit operated to indicate an output of said peak-hold circuit, a gate-signal generating circuit actuated in synchronism with each occurrence of said secondary-voltage signal for generating and feeding a gate signal to said gating circuit, and a reset circuit actuated in synchronism with each occurrence of said secondary-voltage signal for resetting said voltage level of said desired signal held in said peak-hold circuit.

3. The apparatus according to the claim 2 wherein said gating circuit includes a differential-type operational amplifier, and FET having a source terminal connected to an output terminal of said differential-type operational amplifier, a drain terminal connected to an input terminal of said peak-hold circuit and a gate terminal connected to an output terminal of said gate-signal generating circuit.

4. The apparatus according to the claim 3 wherein said gating circuit includes at the pre-stage thereof an amplifier of high input impedance and adapted to receive said secondary-voltage signal, and a low-pass filter actuated to remove all noises from said secondary-voltage signal.

5. The apparatus according to the claim 4 wherein said low-pass filter includes a Butterworth filter.

6. The apparatus according to the claim 2 wherein said peak-hold circuit includes a first FET controllable by an output of said gating circuit, and a second FET actuated upon receipt of a reset signal from said reset circuit to reset said voltage level held in said peak-hold circuit.

7. The apparatus according to the claim 6 wherein said peak-hold circuit is connected to an integrating amplifier including an integrating circuit actuated to convert said voltage level held in said peak-hold circuit into a d.c. voltage signal.

8. The apparatus according to the claim 2 wherein said display unit includes an analog meter.

9. The apparatus according to the claim 2 wherein cable means is provided for connecting a primary winding of said ignition coil with said gate-signal generating circuit and said reset circuit for feeding a signal synchronizing with a primary voltage signal from said ignition system to said gate-signal generating circuit and said reset circuit.

10. The apparatus according to the claim 9 wherein there are provided a low-pass filter actuated to remove all noises from said primary-voltage signal, and a waveform shaper circuit actuated to shape an output of said low-pass filter for feeding an output of said waveform shaper circuit to said gate-signal generating circuit and said reset circuit.

11. The apparatus according to the claim 10 wherein said waveform shaper circuit includes a Schmidt circuit.

12. The apparatus according to the claim 2 wherein said gate-signal generating circuit includes a monostable multi-circuit.

13. The apparatus according to the claim 2 wherein said gate-signal generating circuit includes a delay circuit and a monostable multi-circuit.

14. The apparatus according to the claim 1 wherein said probe means includes a body of electrically insulating material and having a holder portion integrally therewith, a conductor member fixedly disposed within said body and having one end thereof detachably connectable with said secondary terminal of said ignition coil and the other end thereof detachably connectable with a wire of an ignition coil, and a potential divider fixedly disposed within said body and including a plurality of resistance elements connected with each other and having one end thereof connected to said conductor member and an output terminal at the other end thereof.

15. The apparatus according to the claim 1 wherein said plurality of electric circuits include a switching circuit actuated to separate a series of outputs from said operational circuit into an individual signal for each cylinder.

16. The apparatus according to the claim 15 wherein said switching circuit includes a plurality of gating circuits of a number corresponding to the number of said cylinders and adapted to receive a series of output signals from said switching circuit, a trigger probe for detecting presence of said secondary voltage when said secondary voltage is applied to any one of said cylinders, a reset circuit actuated to supply a synchronizing signal received from said trigger probe to any one of said gating circuits for said any one of said cylinders, a register circuit resettable by said reset circuit and adapted to receive said primary-voltage signal, and a logic circuit for supplying an output of said register circuit to each of the other gating circuits of said gating circuits.

17. The apparatus according to the claim 16 wherein said trigger probe includes an induction coil.

18. The apparatus according to claim 2, wherein said reset circuit includes a differentiating circuit and a waveform shaper circuit.

19. The apparatus according to claim 2, wherein said reset circuit includes a differentiating circuit, a waveform shaper circuit and a switching circuit.

20. An apparatus for measuring a pressure under which the air-fuel mixture is to be compressed during the compression stroke in the combustion chamber of an automobile internal-combustion engine, said apparatus comprising probe means having one end connected to a secondary terminal of a secondary winding of a secondary coil and the other end connected to a distributor rotor in an ignition system for detecting a secondary-voltage signal from said ignition system, and a plurality of electric circuits for selecting an induced discharge voltage signal from said secondary-voltage signal detected by said probe means, electrically processing said induced signal and indicating said induced signal in readable form, a frequency-to-voltage converter circuit adapted to convert a frequency of a primary-voltage signal from said ignition system into a voltage-level signal for supplying a d.c. voltage signal which is proportional to the number of revolutions of the engine, and an operational circuit actuated to compute an output of said frequency-to-voltage converter circuit and said voltage level of said induced discharge voltage included in said secondary voltage signal for supplying an output to represent a compression pressure exerted and detected at each top dead point of the piston.

* * * * *